(No Model.) 2 Sheets—Sheet 1.

R. LAVERY.
DIFFERENTIAL GEARING FOR HOISTING AND OTHER PURPOSES.

No. 281,195. Patented July 10, 1883.

Witnesses
J. H. Adams.
J. S. Lavery

Inventor
Richard Lavery (No Model.) 2 Sheets—Sheet 2.
R. LAVERY.
DIFFERENTIAL GEARING FOR HOISTING AND OTHER PURPOSES.
No. 281,195. Patented July 10, 1883.
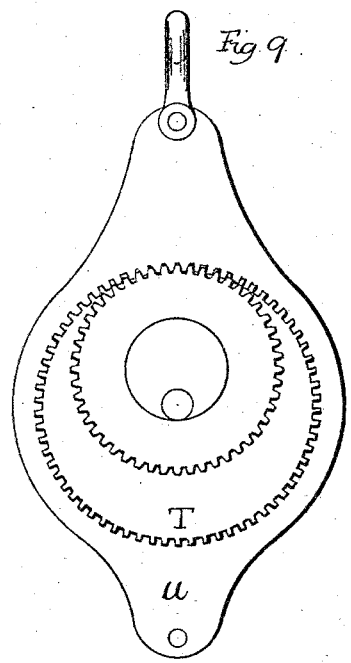
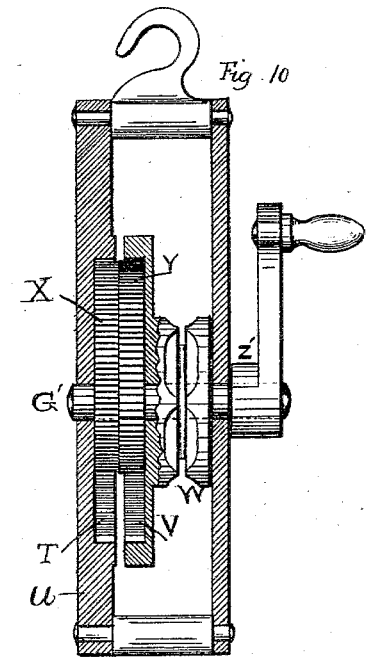
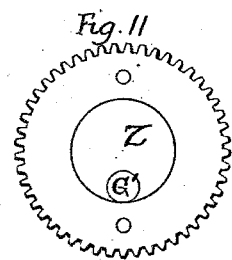
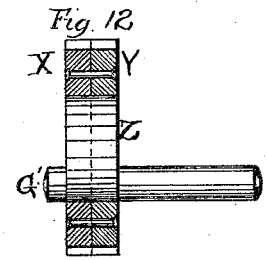
Witnesses
J. H. Adams
J. S. Lavery
Inventor
Richard Lavery
N. PETERS, Photo-Lithographer, Washington, D.C.

UNITED STATES PATENT OFFICE.

RICHARD LAVERY, OF BOSTON, MASSACHUSETTS.

DIFFERENTIAL GEARING FOR HOISTING AND OTHER PURPOSES.

SPECIFICATION forming part of Letters Patent No. 281,195, dated July 10, 1883.

Application filed February 21, 1883. (No model.)

*To all whom it may concern:*

Be it known that I, RICHARD LAVERY, of Boston, in the county of Suffolk, State of Massachusetts, have invented a new and useful Improvement in Differential Gearing for Hoisting and other Purposes; and I do hereby declare that the following is a full, clear, and exact description thereof, which will enable others skilled in the art to make and use the same, reference being made to the accompanying drawings as forming part of this specification.

My invention consists of a system of differential gearing composed of two central gears, one of which is fixed to the bed-plate or framing and cannot revolve, the other being free to revolve upon a central shaft (or its bearings) when caused to rotate by one or more pinions mounted and free to revolve upon a bearing or bearings secured to a wheel, disk, or shaft having its axis concentric to the central gears, and in its revolution causing the pinion or pinions to rotate on axes eccentric to the central gears. As a modified form, internal toothed gearing may be used for the two central gears, one being fixed to the bed-plate or framing and not free to revolve, the other central and revolving gear to be connected directly to the drum or chain-wheel and mounted upon a central shaft, free to revolve when acted upon by a pinion or pinions whose axes are eccentric to the central shaft, upon which they are mounted and rotate. The two central gears and the pinions can all be of a different number of teeth; or the fixed central gear and the second central gear can have an unequal number of teeth, and the pinion or pinions an equal number of teeth; or the fixed central non-rotating gear and the second or rotating central gear can be of equal number of teeth, and the pinion or pinions of an unequal number of teeth, whereby motion is imparted equal to the combined pitch of the number of teeth so varying. By means of the fixed or non-rotating central gear the second or rotating central gear, by which the load is moved, and the pinion or pinions, by which the power is applied to move the load, are locked so that the load cannot run down.

Figure 5:
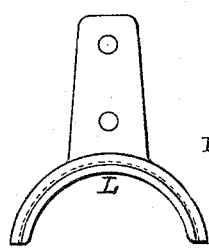
Figure 6:
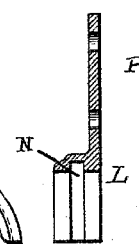
Figure 7:
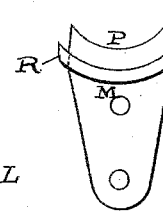
Figure 8:
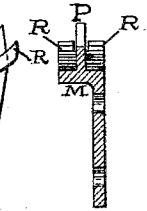
Figure 2:
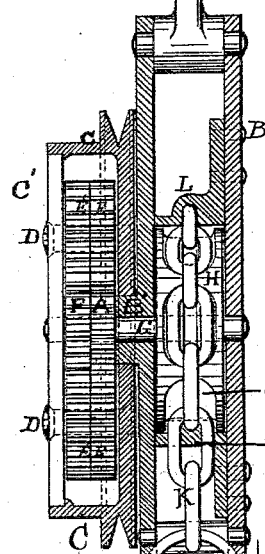
Figure 1:
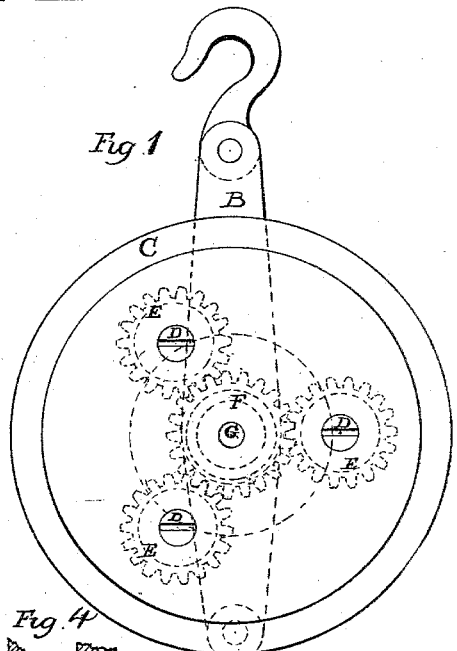
Figure 3:
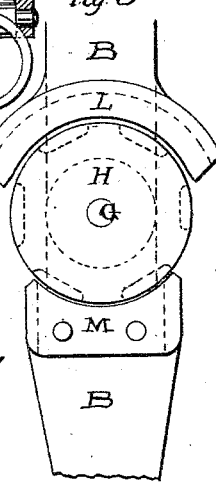
Figure 4:
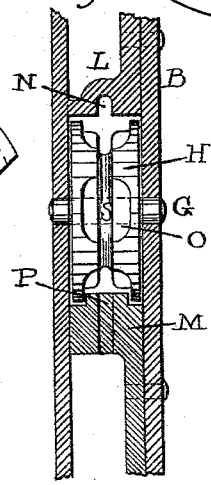

Referring to the accompanying drawings, Figure 1 is a side elevation, showing the gearing in dotted lines. Fig. 2 is a central vertical section. Fig. 3 is a detail view in elevation, somewhat enlarged, of the device for seating and unseating the chain. Fig. 4 is a vertical section of Fig. 3. Figs. 5 to 8 are detail views. Figs. 9 to 12 are modifications of my invention, showing the internal toothed gearing.

A is a central gear, cast or fixed to a hub on the framing or bed-plate B of a hoisting-machine, elevator, winch, or hoist. Upon the hub B is fitted to run loosely a hollow sheave-wheel, C; or a pulley, crank, disk, or gear may be used.

E E E and E' E' E' are pinion-gears, connected together in couples, revolving on shafts or studs D D D, having bearings in the wheel C and the outer disk, C'. The pinions E and E' are to be of suitable diameter and pitch of teeth to gear into the fixed central gear, A, about which they rotate eccentrically, and also to gear into a second central rotating gear, F, the diameter and number of teeth of which may be either greater or less than those of the fixed gear A. The gear F is fastened upon a shaft, G, which passes centrally through the hub B; or the gear F may be secured to or cast in one piece with the chain-wheel or drum H, or whatever is required to be moved or rotated, the whole being free to revolve on the shaft G. If the fixed central gear A and second central gear F do not vary more than one tooth in circumference, the pinion or pinions E can be in one piece and of the same number of teeth; but if there is a greater difference in the number of teeth in circumference the sizes of the pinions are to be so proportioned as to run in gear, and if made in separate parts are to be bolted, keyed, or in some manner strongly secured to each other, so as to revolve as a whole and to gear into both central gears; or the fixed or non-revolving central gear A and the second central rotating gear F can be of the same number of teeth, in which event the pinions E E' are to be in couples of unequal number of teeth, secured together to revolve as a whole; or the pinion E can be made in one piece.

An internal toothed central fixed or non-revolving gear, T, (see Figs. 9 and 10,) can be used, the same forming a part of or secured to the framing U. A second central internal toothed revolving gear, V, Fig. 10, secured to or forming part of the chain-wheel or drum W, on which the load is moved or held, is mounted upon a central shaft, G', and free to revolve when put in motion by the pinion or pinions X Y, the common axis Z of which is eccentric to the axis of the central shaft, G', upon which they are mounted and rotate in a gyratory path. The eccentric axis Z is connected to or forms a part of the shaft G', (see Figs. 9 and 10,) and carries the pinion or pinions X Y with a gyratory motion around the central axis. The pinion or pinions X Y gear into the fixed internal gear T, and also into the revolving internal gear V at the point of contact on the periphery of the pinion or pinions X Y of greatest angular motion when actuated by a crank, pulley, chain-wheel, or other device. The resultant or differential motion imparted to the revolving gear V and to the drum or chain-wheel W will be equal to the number of teeth multiplied by the pitch that the fixed internal gear T has more or less than the internal revolving gear V, or that the pinion X has than the pinion Y, or that the entire train of gears may vary. The power is to be applied to the shaft by a crank or other suitable device. The load can be held by this modified form of construction at any point.

The operation is as follows: If the gear A, secured to the hub B', has one or more teeth in its circumference than the gear F, mounted on the shaft G, by one revolution of the hollow wheel C or disk, upon which the pinions E E' are mounted, the gear F upon the shaft is carried backward one or more teeth; but if the gear A on hub B' has a less number of teeth than the gear F on shaft G, the shaft will be revolved in a forward direction equal to the pitch and number of teeth so varying. If the pinion or pinions E E, gearing into the central fixed non-rotating gear A, have a greater number of teeth on their circumferences than the pinion or pinions E' E', to which they are connected, and which gear into the central rotating gear F, motion will be given to the central gear F, although the central gears, A and F, have an equal number of teeth, and a backward or forward motion will be imparted, as the pinions are of less or greater number of teeth gearing into the central gears, A F, the load being held equally well. By using a fixed non-rotating central gear, the load is held suspended at any point without the use of a pawl or brake, and by a multiplicity of pinions accidents by breaking of teeth are avoided. If a chain-wheel or a hoisting-drum is mounted and keyed to this shaft, a hoisting or pulling power is obtained. If a chain and chain-wheel are used in place of a wire or hemp rope and drum to hoist or haul the load, I provide a segment, L, of the same radius as the chain-wheel, with a central groove to allow the vertical links, or the parts of the chain that project above the periphery of the chain-wheel, to pass through and around for the purpose of forcing the chain into the pockets O or seats in the chain-wheel H, thereby preventing the chain K from slipping or riding on the outside of the chain-wheel H and letting the load fall. It is the common practice to fit the chain loosely into the chain-wheel, and thereby no allowance can be made for the tendency of the chain to stretch. Consequently the chain wears off the bearing-edges of the chain-wheel, causing the chain to slip, &c. If the chain K is made to fit tightly into the pockets O of the chain-wheel H, it will not readily unseat itself. Therefore I place another segment, M, having bifurcated ends R R, on the periphery of the chain-wheel H, and also a central lip or web, P, extending into the central groove, S, of the chain-wheel H, as a positive appliance for unseating the chain.

What I claim as my invention, and desire to secure by Letters Patent, is—

1. A fixed non-rotating central gear serving as a base or fulcrum upon which a second central rotating gear and pinion or pinions depend to act as a pawl and hold the load at any point, and to give a differential motion to the second central rotating gear, thereby moving the load when acted upon by the power applied to and transmitted by the pinion or pinions, substantially as specified.

2. The combination of the central non-rotating gear A, fixed to the framing or bed-plate of the machine B, the hollow sheave-wheel C, shafts D D D, pinions E E E E' E' E', central gear F, shaft G, and the chain-wheel or drum H, on which the load is raised or lowered, substantially as and for the purpose specified.

3. In a differential gearing, the segment M, constructed with the bifurcated ends R R, and a central lip or web, P, in combination with the chain K, chain-wheel H, and frame B, substantially as and for the purpose set forth and specified.

4. The combination of a central internal toothed non-rotating gear fixed to the bed-plate or frame of the machine, one or more coupled pinions, a central internal toothed rotating gear, a chain-wheel or drum, a main shaft, and an eccentric bearing, substantially as and for the purpose specified.

In testimony whereof I affix my name in presence of two subscribing witnesses.

RICHARD LAVERY.

Witnesses:
DANIEL P. MINER,
J. S. LAVERY.